United States Patent [19]

Yaginuma

[11] Patent Number: 5,186,887
[45] Date of Patent: Feb. 16, 1993

[54] APPARATUS FOR INSPECTING PERIPHERAL SURFACES OF NUCLEAR FUEL PELLETS

[75] Inventor: Yoshitaka Yaginuma, Ibaraki, Japan

[73] Assignee: Mitsubishi Nuclear Fuel Co., Tokyo, Japan

[21] Appl. No.: 767,817

[22] Filed: Sep. 30, 1991

[30] Foreign Application Priority Data

Oct. 2, 1990 [JP] Japan ................... 2-264509

[51] Int. Cl.$^5$ ........................................... G21C 17/06
[52] U.S. Cl. ..................... 376/248; 376/245; 376/259; 376/261; 209/538; 209/587; 209/655; 209/657; 356/237; 356/426; 356/394; 382/48
[58] Field of Search ............... 376/245, 248, 252, 259, 376/253, 251, 250, 257, 261, 265, 266, 337, 338; 356/237, 426, 394; 209/538, 587, 655, 657; 382/48

[56] References Cited

U.S. PATENT DOCUMENTS

| | | | |
|---|---|---|---|
| 3,283,896 | 11/1966 | Jirik et al. | 209/587 |
| 3,355,014 | 11/1967 | Howles | 209/587 |
| 4,162,126 | 7/1979 | Nakagawa et al. | 356/237 |
| 4,193,502 | 3/1980 | Marmo | 209/555 |
| 4,349,112 | 9/1982 | Wilks et al. | 209/538 |
| 4,377,238 | 3/1983 | Wilks et al. | 209/587 |
| 4,496,056 | 1/1985 | Schoenig, Jr. et al. | 209/539 |
| 4,532,723 | 8/1985 | Kellie et al. | 356/73 |
| 5,019,326 | 5/1991 | Yaginuma et al. | 376/261 |

FOREIGN PATENT DOCUMENTS

| | | | |
|---|---|---|---|
| 56-57938 | 5/1981 | Japan | 356/426 |
| 56-168107 | 12/1981 | Japan | 356/237 |
| 57-93238 | 6/1982 | Japan | 376/245 |
| 214243 | 10/1985 | Japan | 376/245 |
| 1223588 | 10/1986 | Japan | 376/245 |
| 1223589 | 10/1986 | Japan | 376/245 |
| 3131099 | 6/1988 | Japan | 376/245 |

OTHER PUBLICATIONS

McLemore, D. R. et al., "Automatic Surface Flaw Inspection of Nuclear Fuel Pellets", 1978, *Applications of Electronic Imaging Systems*, vol. 143, pp. 129–136.

Primary Examiner—Donald P. Walsh
Assistant Examiner—Chrisman D. Carroll
Attorney, Agent, or Firm—Oblon, Spivak, McClelland, Maier & Neustadt

[57] ABSTRACT

There is disclosed an inspection apparatus for peripheral surfaces of nuclear fuel pellets which includes a handling unit, an image pick-up device, a judging device and a sorting unit. The handling unit holds a prescribed number of nuclear fuel pellets in a line and rotates the same on their axes. The image pick-up device is disposed adjacent to the handling unit, and picks up image data as to the peripheral surfaces of the nuclear fuel pellets. The judging device is operably connected to the image pick-up device, and analyzes the image data outputted from the image pick-up device to output judging signals. The sorting unit is operably connected to the judging device and separates defective pellets from non-defective pellets based on the judging signals. The sorting unit includes a plurality of sorting members and actuators. The sorting members are disposed adjacent to the handling unit so as to correspond to the nuclear fuel pellets, respectively. The actuators are operably connected to the judging device and the sorting members, and operate the sorting members based on the judging signals.

8 Claims, 5 Drawing Sheets

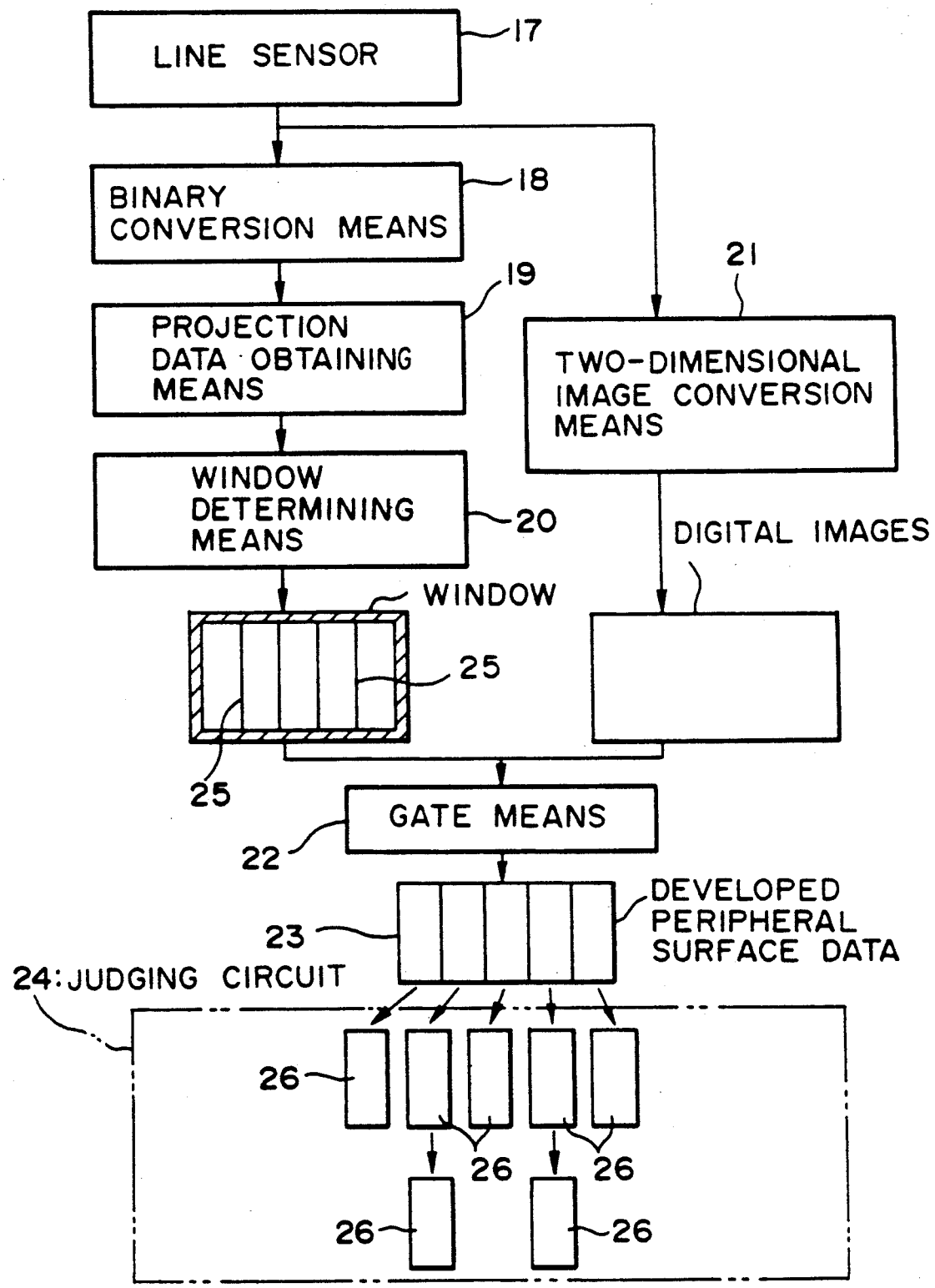

APPARATUS FOR INSPECTING PERIPHERAL SURFACES OF NUCLEAR FUEL PELLETS

BACKGROUND OF THE INVENTION

The present invention relates to an apparatus for inspecting the peripheral surfaces of cylindrical nuclear fuel pellets for defects while rotating the pellets on their own axes.

In the manufacture of nuclear fuel pellets of uranium dioxide, very severe quality control is required. In particular, those defects which cannot be found by visual inspection must be found by non-destructive inspection.

However, with the conventional inspection apparatuses for peripheral surfaces of nuclear fuel pellets, much time has been required for inspecting and sorting the pellets.

SUMMARY OF THE INVENTION

It is therefore the object of the present invention to provide an inspection apparatus for peripheral surfaces of nuclear fuel pellets by which the nuclear fuel pellets can be inspected automatically and sorted quickly and correctly.

According to the invention, there is provided an apparatus for inspecting peripheral surfaces of nuclear fuel pellets, comprising:

a handling unit for holding a prescribed number of nuclear fuel pellets in a line and rotating the same on axes thereof;

an image pick-up device disposed adjacent to the handling unit for picking up image data as to the peripheral surfaces of the nuclear fuel pellets;

a judging device operably connected to the image pick-up device for analyzing the image data outputted from the image pick-up device to output judging signals; and a sorting unit operably connected to the judging device for separating defective pellets from non-defective pellets based on the judging signals, the sorting unit including a plurality of sorting members disposed adjacent to the handling unit so as to correspond to the nuclear fuel pellets, respectively, and operating means operably connected to the judging device and the sorting members for operating the sorting members based on the judging signals.

BRIEF DESCRIPTION OF THE DRAWINGS

FIG. 3 is a block diagram showing a judging device of the apparatus of FIG. 1;

DESCRIPTION OF PREFERRED EMBODIMENTS OF THE INVENTION

Figure 1:
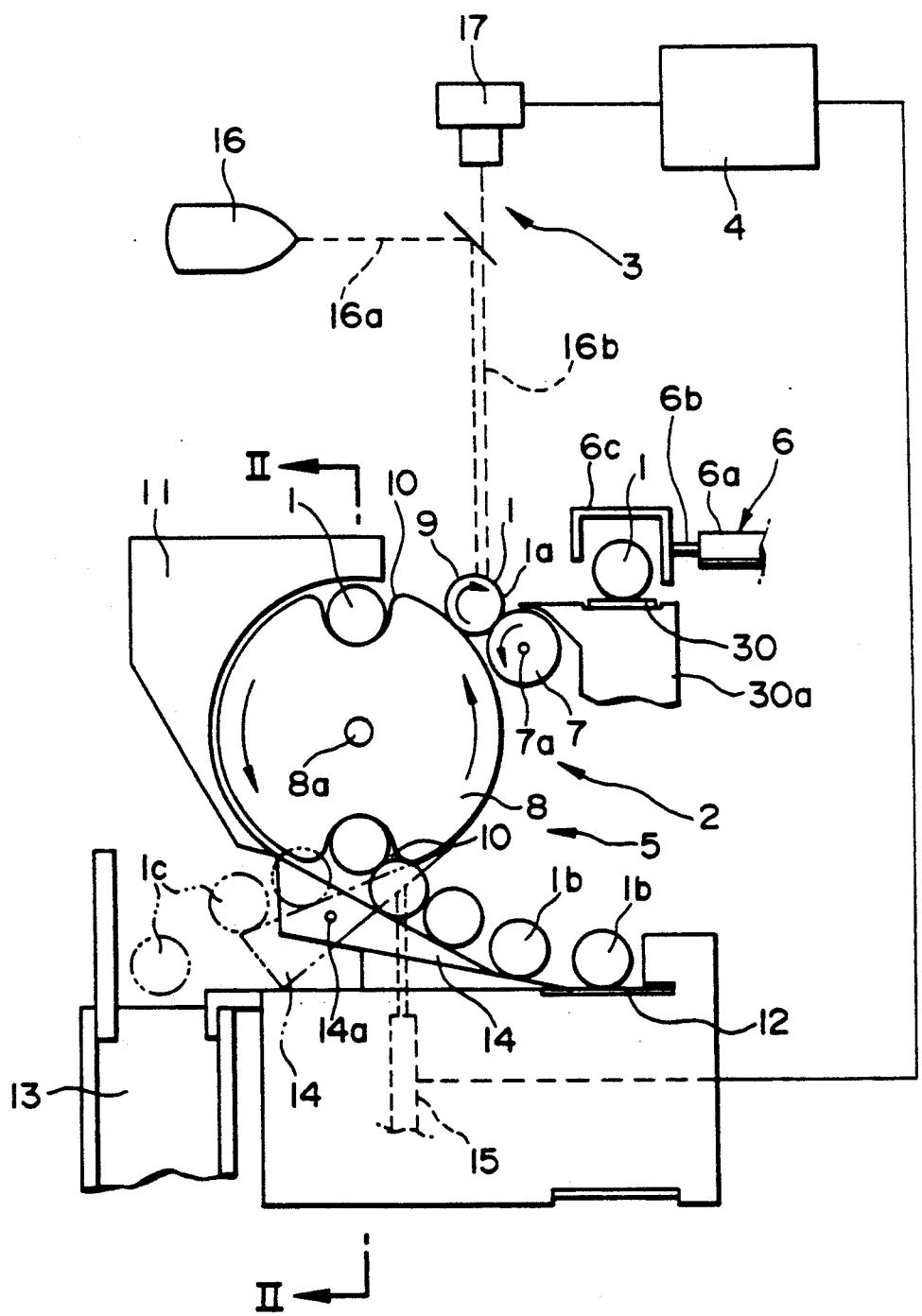
FIG. 1 is a schematic side elevational view of an inspection apparatus in accordance with the present invention.
Figure 2:
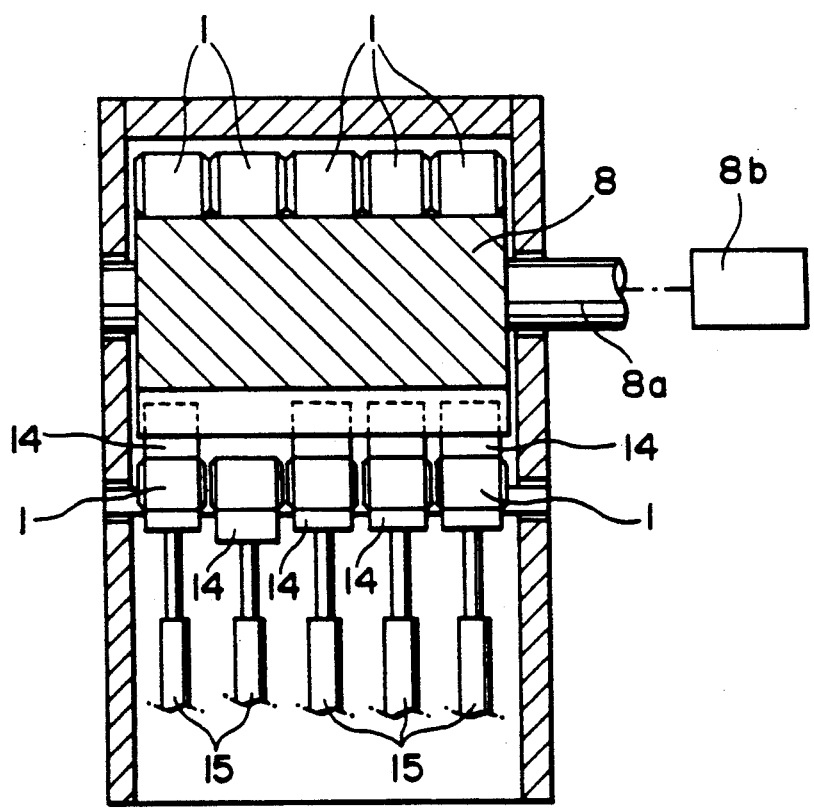
FIG. 2 is a cross-sectional view of the apparatus of FIG. 1 taken along the line II—II in FIG. 1.
Figure 4A:
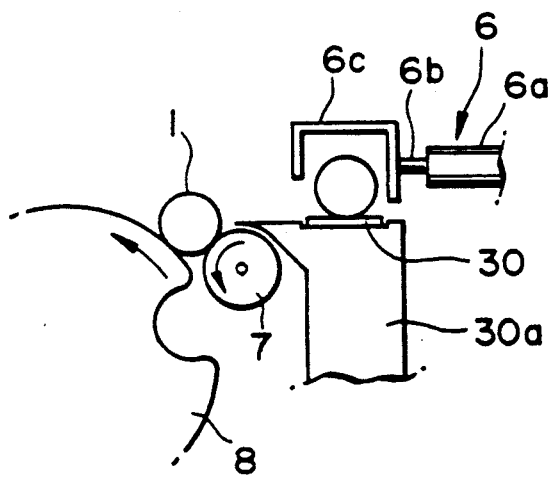
FIG. 4a to FIG. 4d are schematic views showing a loading device of the apparatus of FIG. 1.
Figure 4B:
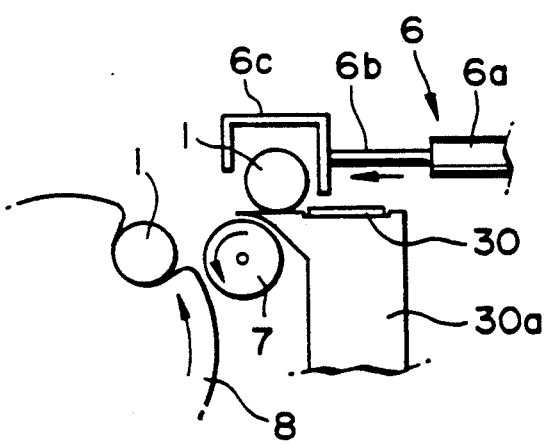
Figure 4C:
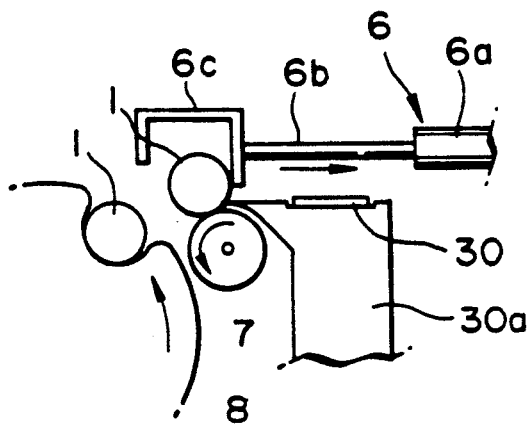
Figure 4D:
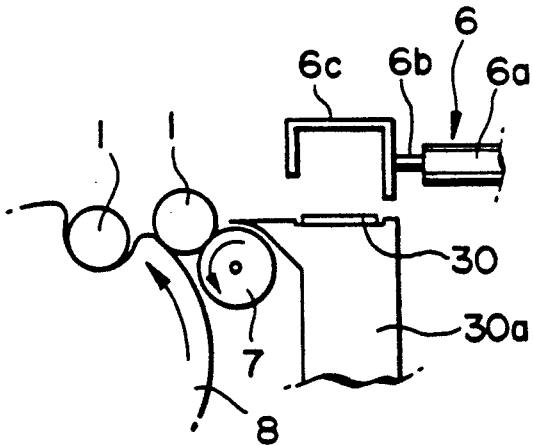

FIGS. 1 to 3 depict an embodiment of the inspection apparatus for peripheral surfaces of nuclear fuel pellets in accordance with the present invention. The inspection apparatus comprises a handling unit 2 for holding a prescribed plural number of nuclear fuel pellets 1 in a line and rotating the same on their own axes, an image pick-up device 3 for picking up image data as to the peripheral surfaces 1a of the pellets 1, a judging device 4 for analyzing the image data outputted from the image pick-up device 3 to judge whether the pellets are acceptable or not, and a sorting unit 5 for separating defective pellets and non-defective pellets based on judging signals outputted from the judging device 4.

The handling unit 2 includes a loading device 6, a smaller-diameter roller 7 and a larger-diameter roller 8. The loading device 6 includes a cylinder composed of a cylinder body 6a and a piston rod 6b, and a guide member 6c of a generally channel shaped cross-section mounted at the distal end of the piston rod 6b. This loading device 6 is disposed at the end of a belt conveyor 30, by which nuclear fuel pellets are conveyed in a line such that they are aligned with one another. The smaller-diameter roller 7 is disposed adjacent to the loading device 6 and is rotatably secured to a shaft 7a, which is parallel to the axes of the pellets 1. As shown in FIG. 1, a belt support 30a of the belt conveyor 30 includes a protruding portion disposed at its end position so as to extend laterally, and the smaller-diameter roller 7 is disposed immediately beneath the protruding portion. The larger-diameter roller 8 is disposed adjacent to the smaller-diameter roller 7, and is mounted on a shaft 8a for rotation therewith. The shaft 8a, which extends parallel to the shaft 7a, is connected to a drive means 8b such as an electric motor, so that the larger-diameter roller 8 can be rotated about the shaft 8a at a constant peripheral velocity. Thus, the smaller-diameter roller 7 and the larger-diameter roller 8 cooperate with each other to define an inspecting position therebetween, and the nuclear fuel pellets arranged in line are moved by the loading device 6 to the inspecting position.

A pair of diagonally opposite ejecting grooves 10 are formed in the outer peripheral surface of the larger-diameter roller 8 so as to extend longitudinally thereof. Each ejecting groove 10 is dimensioned such that all of the pellets 1 located at the inspecting position 9 are received therein together. A guide frame 11 for preventing the pellets from falling out from the grooves 10 is provided so as to cover about half the peripheral surface of the larger-diameter roller 8.

The sorting unit 5, which is disposed immediately beneath the larger-diameter roller 8, involves a discharging belt conveyor 12, a recovery box 13, a plurality of sorting members or plates 14 mounted so as to be pivotable about an axis 14a, and actuators 15 such as cylinders (operating means) operably connected to the judging device 4. The sorting plates 14 are arranged between the discharging belt conveyor 12 and the recovery box 13 in longitudinally spaced relation along the shaft 8a of the larger-diameter roller 8 such that their number corresponds to that of the pellets 1 in line. Each actuator 15 is operably connected to a respective one of the sorting plates 14 to pivot the plate such that the non-defective pellets 1b are conveyed to the discharging belt conveyer 12 while the defective pellets 1c are collected into the recovery box 13. The discharging belt conveyor 12 conveys the pellets 1 to a prescribed position at the next station.

The image pick-up device 3, which is arranged right above the inspecting position 9 at the handling unit 5, includes a light source 16 and a sensor means such as a line sensor 17. The light source 16 radiates illuminating light 16a to the prescribed number of the pellets 1 held at the inspecting position 9, and the light 16b reflected from the peripheral surfaces of the pellets 1 is received by the line sensor 17 to produce video signals, which are outputted to the judging device 4.

The judging device 4, which is operably connected to the image pick-up device 3, processes the video signals outputted from the image pick-up device 3 to detect the boundaries between the adjacent pellets 1 in line and to detect defects on the peripheral surface of each pellet 1, and outputs the judging signals regarding the defects. More specifically, as shown in FIG. 3, the video signals outputted from the line sensor 17 are converted by a binary conversion means 18 into binary signals based on the preset binary levels which are preset in accordance with the desired image of the pellets. Then, in a projection data obtaining means 19, which is operably connected to the binary conversion means 18, the number of picture elements which are located in a row corresponding to the circumferential direction and have one of the binary values is summed up through whole lines and is stored as projection data in memory. Subsequently, the effective image of the peripheral surface and the boundaries 25 of the pellets 1 arranged in line are detected based on the projection data, and a window based on the image of the peripheral surface and the boundaries of the pellets is determined by a window determining means 20, which is connected to the projection data obtaining means 19.

The video signals outputted from the line sensor 17 are further inputted to a two-dimensional image conversion means 21, and are converted into two dimensional digital images therein. The window determined by the window determining means 20 is overlaid on these digital images by means of a gate means 22, and data 23 as to the developed peripheral surfaces, which are obtained based on the level of luminance of the video signals, are outputted to a judging means 24.

Thereafter, in the judging means 24, the developed peripheral surface data 23 are evaluated, and data 26 regarding the defective pellets and data 26 regarding the non-defective pellets are selectively obtained.

The inspection method using the above inspection apparatus will be hereinafter described. In the explanation, the picture images of the line sensor 17 includes 1024 lines and 1024 picture elements per line.

First, the larger-diameter roller 8 is rotated at a constant peripheral velocity in a direction of the arrow indicated in FIG. 1. Then, the piston rod 6b of the loading device 6 is caused to extend, and the pellets 1 are conveyed by the guide member 6c to the inspecting position 9 when one of the ejection grooves 10 of the larger diameter roller 8 has passed the inspecting position 9. The pellets 1 thus moved to the inspecting position 9 begin to rotate on their own axes. When the rotation of the pellets 1 reaches the steady state, the line sensor 17 picks up light 16b reflected from the pellets 1 while illuminating light 16a is being radiated from the light source 16 to the pellets 1, and outputs video signals on the peripheral surfaces of the pellets 1 to the judging device 4. In the foregoing, the pellets 1 make at least one rotation.

Subsequently, the video signals are converted by the binary conversion means 18 into binary signals based on the preset binary levels, and in the projection data obtaining means 19, the number of picture elements which are located in a row corresponding to the circumferential direction of the pellets and have one of the binary values is summed up through whole lines and is stored as projection data in memory. Then, the boundaries 25 of the pellets 1 arranged in line are detected based on the projection data, and a window is determined by the window determining means 20.

In addition, the video signals are further outputted to the two-dimensional image conversion means 21, and are converted into two dimensional digital images therein. The window determined by the window determining means 20 is overlaid on these digital images by means of the gate means 22, and thus data 23 as to the developed peripheral surfaces, which are obtained based on the level of luminance of the video signals, are outputted to the judging means 24. Thereafter, in the judging means 24, the developed peripheral surface data 23 are evaluated, and the presence of defects on the pellets are detected.

Then, those actuators 15 which correspond to the non-defective pellets 1b are driven based on the judging signals outputted from the judging means 24, and the sorting plates 14 corresponding to the non-defective pellets 1b pivot on their shafts 14a to the position as indicated by the solid line in FIG. 1, while those plates corresponding to the defective pellets 1c pivot on the shafts to the position as indicated by the two-dot chain line.

When the larger-diameter roller 8 makes a half turn and the ejecting groove 10 is located immediately under the pellets 1, all of the pellets 1 are received together in the groove 10. As the larger-diameter roller 8 further rotates, the pellets 1 are carried by it and fall on the corresponding sorting plates 14, respectively. Thus, the non-defective pellets 1b are guided by the sorting plates 14 as indicated by the solid line in FIG. 1, into the discharging belt conveyor 12, while the defective pellets 1c are guided by the sorting plates 14 as indicated by two-dot chain line, into the recovery box 13.

Then, the above procedures are repeated, and the pellets 1 are inspected as to their peripheral surfaces for every prescribed number of pellets.

In the foregoing, as best shown in FIGS. 4a to 4d, while the pellets 1 located at the inspecting position 9 are being inspected, the next pellets 1 to be inspected are conveyed inside the guide member 6c of the loading device 6. As the belt conveyor 30 is stopped, the inspected pellets 1 are received by the ejecting groove 10 of the larger-diameter roller 8, and simultaneously the piston rod 6b of the loading device 6 is extended, so that the pellets 1 on the belt conveyor 30 are guided by the guide member 6c to the inspecting position 9. When the pellets 1 are loaded on the rollers 7 and 8, the piston rod 6b is retracted and the belt conveyor 30 begins to move, and the above procedures are repeated.

As described above, the images of the peripheral surfaces of the pellets 1 conveyed in a line are picked up by the image pick-up device 3 while rotating the pellets 1, and the video signals outputted from the image pick-up device 3 are inputted to the judging device 4, in which the defects of the pellets 1 are judged. The actuators 15 are driven based on the output signals from the judging device 4 to pivot the sorting plates 14, and the non-defective pellets are guided by the sorting plates to the discharging belt conveyor 12 while the defective pellets are guided to the recovery box 13. Accordingly, the inspection of the peripheral surfaces of the nuclear fuel pellets and the sorting operation of the inspected pellets can be quickly carried out in a short operating time, so that the efficiency of the inspection operation can be substantially enhanced.

Furthermore, with the above judging device 4, the boundaries of the prescribed number of pellets 1 conveyed in a line can be quickly detected, and the acceptance or rejection of the nuclear fuel pellets 1 can be quickly determined correctly.

Moreover, inasmuch as the handling unit 2 includes the smaller-diameter roller 7 disposed adjacent to the loading device 6, the pellets 1 caused to move from the loading device 6 pass through the smaller-diameter roller 7 and are smoothly located at the inspecting position 9 with no shock given to the pellets 1.

Figure 5:
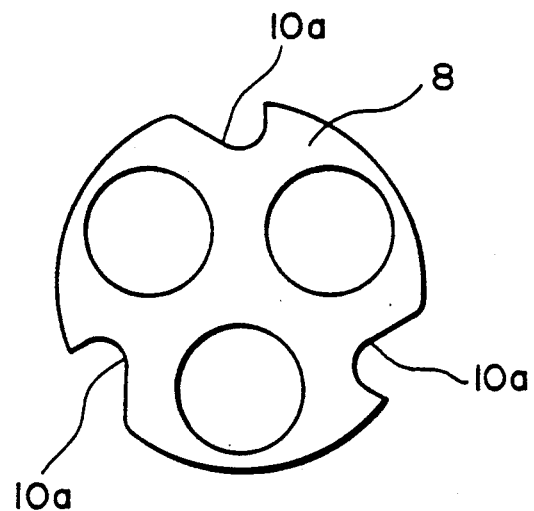
FIG. 5 is a side elevational view of a modified larger-diameter roller used in the apparatus of FIG. 1.
Figure 6:
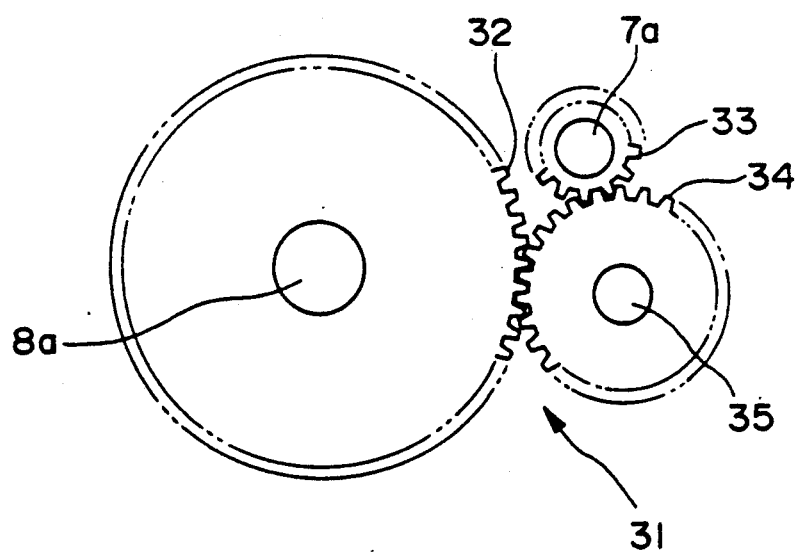
FIG. 6 is a schematic side elevational view of a modified drive mechanism for a handling unit used in the apparatus of FIG. 1.

Obviously many modifications and variations of the present invention are possible in the light of the above teachings. For example, in the previous embodiment, the number of the ejecting grooves 10 is two. However, as shown in FIG. 5, the larger-diameter roller 8 may be modified so as to have three or more ejecting grooves 10a disposed in circumferentially equally spaced relation to one another. Furthermore, not only the larger-diameter roller 8 but also the smaller-diameter roller 7 may be driven by a suitable drive mechanism in the same direction at an identical peripheral velocity. FIG. 6 depicts gear arrangements for such a drive mechanism 31. The mechanism 31 comprises a larger-diameter gear 32 fixedly mounted on the shaft 8a for the larger-diameter roller 8, a smaller-diameter gear 33 fixedly mounted on the shaft 7a for the smaller-diameter roller 7, a drive gear 34 meshed with the gears 32 and 33 and mounted on a drive shaft 35, and a drive means such as a motor for rotating the drive shaft 35.

What is claimed is:

1. An apparatus for inspecting peripheral surfaces of nuclear fuel pellets, comprising:
   a handling unit for holding a plurality of nuclear fuel pellets in a line and rotating the same on axes thereof;
   a loading device for loading said nuclear fuel pellets onto said handling unit;
   an image pick-up device disposed adjacent to said handling unit for picking up image data as to the peripheral surfaces of said nuclear fuel pellets;
   a judging device operably connected to said image pick-up device for analyzing said image data outputted from said image pick-up device to output judging signals; and
   a sorting unit operably connected to said judging device for separating defective pellets from non-defective pellets based on said judging signals, said sorting unit including a plurality of sorting members disposed adjacent to said handling unit so as to correspond to said nuclear fuel pellets, respectively, and operating means operably connected to said judging device and said sorting members for operating said sorting members based on said judging signals;
   wherein: said handling unit includes a first roller having a first predetermined diameter disposed rotatably about an axis thereof and adjacent to said loading device, a second roller having a second predetermined diameter which is comparatively larger than the first predetermined diameter of the first roller disposed adjacent to said first roller so as to be rotatable about an axis parallel to said axis of said first roller, said first roller and said second roller cooperating to define an inspecting position therebetween, said second roller including at least one ejecting groove for receiving and carrying said plurality of nuclear fuel pellets, said ejecting groove being formed in a peripheral surface of said second roller so as to extend axially thereof.

2. An inspection apparatus according to claim 1, further comprising a drive means operably connected to said first roller and said second roller for rotating said first roller and said second roller in an identical direction at an identical constant peripheral velocity.

3. An inspection apparatus according to claim 1, in which said operating means includes a plurality of actuators mounted so as to correspond to said plurality of sorting members, respectively.

4. An inspection apparatus according to claim 1, in which said image pick-up device includes a light source disposed adjacent to said inspecting position for radiating illuminating light to said plurality of nuclear fuel pellets located at said inspecting position, sensor means for receiving light reflected from said plurality of nuclear fuel pellets and for outputting video signals to said judging device.

5. An inspection apparatus according to claim 1, in which said judging device includes:
   a binary conversion means for converting the image data into binary signals based on preset binary levels;
   a projection data obtaining means operably connected to said binary conversion means for obtaining projection data and storing the same, said projection data being the number of picture elements which are located in a row corresponding to circumferential direction and have one of binary values;
   a two-dimensional image conversion means for converting the image data from said image pick-up device into two dimensional digital images;
   a window determining means connected to said projection data obtaining means for determining a window;
   a gate means for overlaying said window determined in said window determining means, on said two dimensional digital images; and
   a judging circuit for judging presence of defects on said nuclear fuel pellets based on data outputted from said gate to produce said judging signals.

6. An inspection apparatus according to claim 1, in which said second roller includes a plurality of said ejecting grooves arranged in circumferentially equally spaced relation to one another.

7. An inspection apparatus according to claim 6, further comprising a guide frame for preventing said pellets received in said ejecting grooves from falling out, said guide frame being disposed adjacent to said second roller so as to cover about half the peripheral surface thereof.

8. An inspection apparatus according to claim 1, wherein said sorting members of said sorting unit comprise pivotable plates, each of said plates being disposed vertically below said second roller, each of said plates being pivotable in response to said judging signals between a first position in which said plate defines a first path for receiving non-defective pellets from said ejecting groove of said second roller and guiding said non-defective pellets to a conveying means, and a second position in which said plate defines a second path for receiving defective pellets from said ejecting groove of said second roller and guiding said defective pellets to a recovery means.

* * * * *